(12) United States Patent
Kishida et al.

(10) Patent No.: US 12,464,439 B2
(45) Date of Patent: Nov. 4, 2025

(54) TERMINAL APPARATUS, BASE STATION, COMMUNICATION METHOD, AND COMMUNICATION PROGRAM

(71) Applicant: NTT, Inc., Tokyo (JP)

(72) Inventors: Akira Kishida, Musashino (JP); Yasuhiko Inoue, Musashino (JP); Kengo Nagata, Musashino (JP); Yusuke Asai, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 446 days.

(21) Appl. No.: 17/791,462

(22) PCT Filed: Jan. 10, 2020

(86) PCT No.: PCT/JP2020/000670
§ 371 (c)(1),
(2) Date: Jul. 7, 2022

(87) PCT Pub. No.: WO2021/140651
PCT Pub. Date: Jul. 15, 2021

(65) Prior Publication Data
US 2023/0033744 A1    Feb. 2, 2023

(51) Int. Cl.
*H04W 48/16* (2009.01)
*H04W 72/56* (2023.01)
*H04W 74/0808* (2024.01)

(52) U.S. Cl.
CPC .......... *H04W 48/16* (2013.01); *H04W 72/56* (2023.01); *H04W 74/0808* (2013.01)

(58) Field of Classification Search
CPC . H04W 48/16; H04W 72/56; H04W 74/0808; H04W 28/0236; H04W 28/0247;
(Continued)

(56) References Cited

U.S. PATENT DOCUMENTS 6,327,254 B1    12/2001   Chuah
2005/0135295 A1    6/2005   Walton et al.
(Continued)

FOREIGN PATENT DOCUMENTS

JP    H11298533    10/1999
JP    5226214    3/2013
(Continued)

OTHER PUBLICATIONS

[No Author Listed], "Part 11: Wireless LAN Medium Access Control (MAC) and Physical Layer (PHY) Specifications," IEEE Computer Society, IEEE Std 802.11-2016, Dec. 7, 2016, 3538 pages.
(Continued)

*Primary Examiner* — Vinncelas Louis
(74) *Attorney, Agent, or Firm* — Fish & Richardson P.C.

(57) ABSTRACT

A terminal apparatus (20) according to an embodiment of the present disclosure includes a data processing unit (201) and a wireless signal processing unit (202). The data processing unit (201) generates a first frame including a requirement related to a latency during data communication and inquiring a base station (10) whether communication that satisfies the requirement is possible. The wireless signal processing unit (202) transmits the first frame.

3 Claims, 11 Drawing Sheets

(58) Field of Classification Search
CPC ......... H04W 28/0278; H04W 28/0992; H04W 84/12; H04L 47/801
See application file for complete search history.

(56) References Cited

U.S. PATENT DOCUMENTS

| | | | |
|---|---|---|---|
| 2018/0279359 A1* | 9/2018 | Liu | ................... H04W 28/0278 |
| 2019/0274171 A1 | 9/2019 | Viger et al. | |
| 2021/0076420 A1* | 3/2021 | Xin | ...................... H04L 47/801 |

FOREIGN PATENT DOCUMENTS

| | | |
|---|---|---|
| JP | 2014017549 | 1/2014 |
| JP | 2019536334 | 12/2019 |
| WO | WO 2018175919 | 9/2018 |

OTHER PUBLICATIONS

Extended European Search Report in European Appln No. 20911599.7, dated Sep. 12, 2023, 12 pages.

"[No Author Listed], ""Part 11: Wireless LAN Medium Access Control (MAC) and Physical Layer (PHY) Specifications: 10.22.2 HCF contention based channel access (EDCA),"" IEEE Std 802. Nov. 2016, Dec. 7, 2016, 18 pages".

Kim et al., "Latency enhancement in multi-link," IEEE 802.11 Wireless LAN (WLAN) Working Group Submission, Nov. 2019, 12 pages.

* cited by examiner

TERMINAL APPARATUS, BASE STATION, COMMUNICATION METHOD, AND COMMUNICATION PROGRAM

CROSS-REFERENCE TO RELATED APPLICATIONS

This application is a National Stage application under 35 U.S.C. § 371 of International Application No. PCT/JP2020/000670, having an International Filing Date of Jan. 10, 2020, the disclosure of which is considered part of the disclosure of this application, and is incorporated in its entirety into this application.

TECHNICAL FIELD

Embodiments relate to a terminal apparatus, a base station, a communication method, and a communication program.

BACKGROUND ART

Base stations and terminals in a wireless local area network (LAN) access channels using carrier sense multiple access with collision avoidance (CSMA/CA) and transmit wireless signals. In CSMA/CA, the base stations and the terminals confirm that channels are not being used by other terminals or the like through carrier sense while waiting for a time defined by the access parameters and then transmit the wireless signals.

As one of priority control schemes in wireless LAN, enhanced distribution channel access (EDCA) is defined. In EDCA, data from upper layers is categorized into any of four access categories, that is, AC_VO (voice), AC_VI (video), AC_BE (best effort), and AC_BK (background). Also, in EDCA, CSMA/CA is performed for each access category. In EDCA, the access parameters are allocated such that relative priority is placed on transmission of the wireless signals in the order of AC_VO, AC_VI, AC_BE, and AC_BK.

CITATION LIST

Non Patent Literature

NPL 1: IEEE Std 802. 11-2016, "10.22.2 HCF contention based channel access (EDCA)", 7 Dec. 2016

SUMMARY OF THE INVENTION

Technical Problem

EDCA enables relative priority among traffic. Here, a real-time application (RTA) used for, for example, control of network games and industrial robots, for example, may have an absolute latency and jitter requirements for each application. It is not possible to ascertain, only based on the relative prioritization, whether an RTA is available or whether the availability of an RTA can be controlled.

Means for Solving the Problem

A terminal according to an aspect of the present disclosure includes a data processing unit and a wireless signal processing unit. The data processing unit generates a first frame including requirements related to a latency during data communication and inquiring a base station whether communication that satisfies the above-described requirements is possible. The wireless signal processing unit transmits the first frame.

Advantageous Effects of the Invention

According to the embodiment, There is provided a wireless communication environment corresponding to the requirements.

DESCRIPTION OF EMBODIMENTS

Figure 1:
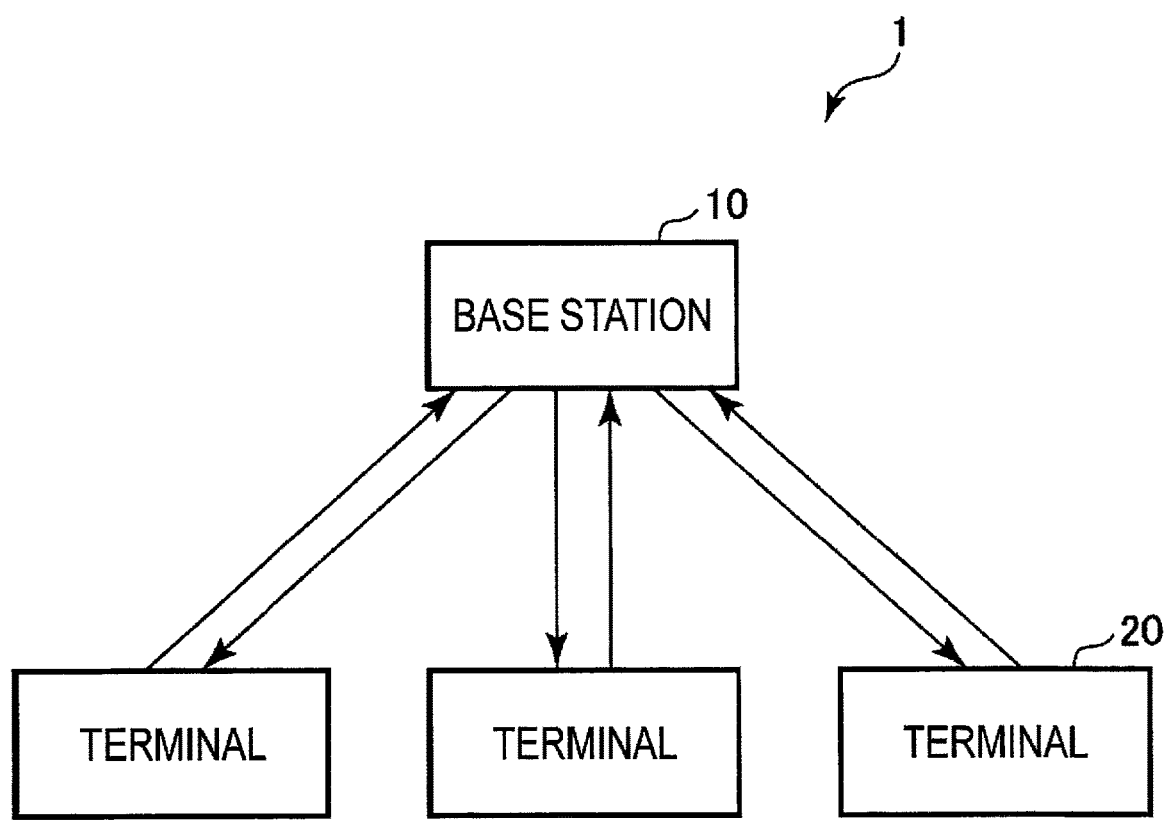
FIG. 1 is a diagram illustrating an example of a communication system configuration according to an embodiment of the present disclosure.

Hereinafter, embodiments will be described based on the drawings. FIG. 1 is a diagram illustrating a configuration of an example of a communication system according to an embodiment. A communication system 1 includes a base station 10 and a plurality of terminals 20. The base station 10 communicates with the terminals 20 in a predefined service area in a wireless manner. Although not illustrated in FIG. 1, communication may be performed between the terminals 20.

Figure 2:
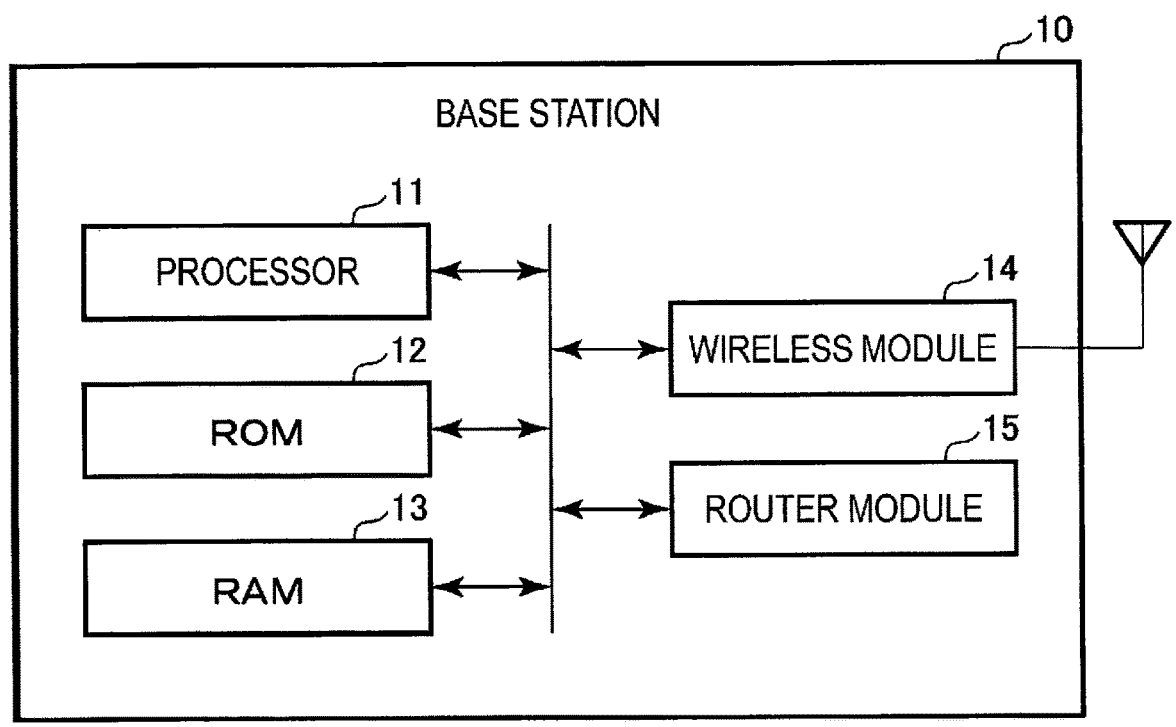
FIG. 2 is a diagram illustrating an example of a hardware configuration of a base station.

Next, an example of a hardware configuration of the base station 10 will be described with reference to FIG. 2. The base station 10 is an access point (AP) for the terminals 20. The base station 10 is not necessarily a fixed one and may be one mounted in a mobile object. The base station 10 includes a processor 11, a read only memory (ROM) 12, a random access memory (RAM) 13, a wireless module 14, and a router module 15.

The processor 11 is a processing device that controls the entire base station 10. The processor 11 is, for example, a central processing unit (CPU). The processor 11 is not limited to a CPU. Also, an application specific IC (ASIC) or the like may be used instead of a CPU. Also, the number of the processors 11 may not be one and may be two or more.

The ROM 12 is a storage device dedicated for reading. The ROM 12 stores firmware, software, and various programs required for operations of the base station 10. The RAM 13 is an arbitrarily writable storage device. The RAM 13 is used as a work area for the processor 11 and temporarily stores the firmware and the like stored in the ROM 12.

The wireless module 14 is a module configured to perform processing required for wireless LAN communication. The wireless module 14 forms a media access control (MAC) frame from data transferred from the processor 11, for example, converts the formed MAC frame into a wireless signal, and transmits the wireless signal to the terminal 20. Also, the wireless module 14 receives a wireless signal from the terminal 20, extracts data from the received wireless signal, and transfers the data to the processor 11, for example.

The router module 15 is provided for the base station 10 to communicate with a server, which is not illustrated, via a network. Note that the base station 10 may not necessarily include the router module 15. The base station 10 may be configured to access a router provided outside the base station 10 through wireless communication or wired communication and connect to the network through the router.

Figure 3:
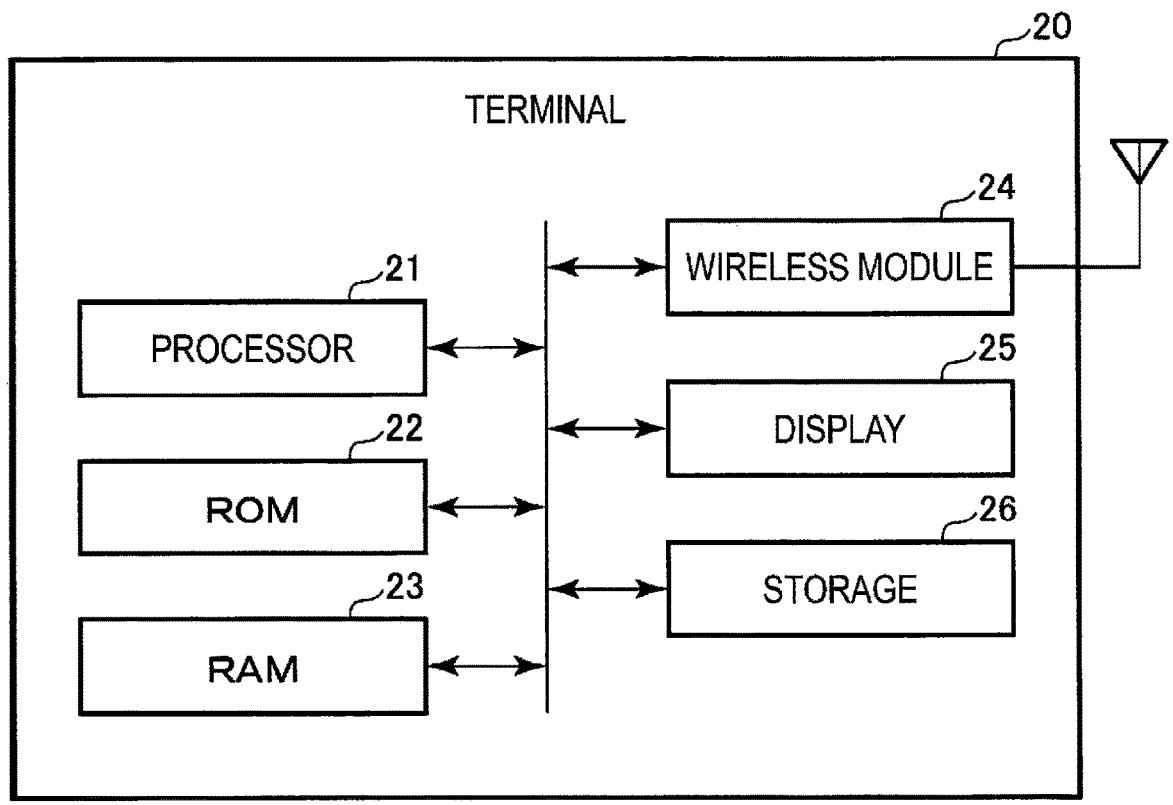
FIG. 3 is a diagram illustrating an example of a hardware configuration of a terminal.

Next, an example of a hardware configuration of the terminal 20 will be described with reference to FIG. 3. The terminal 20 is a terminal device (STA) such as a smartphone or a tablet terminal. The terminal 20 may be a mobile terminal, a terminal mounted in a mobile object, or a fixed terminal. The terminal 20 includes a processor 21, a ROM 22, a RAM 23, a wireless module 24, a display 25, and a storage 26.

The processor 21 is a processing device that controls the entire terminal 20. The processor 21 is, for example, a CPU. The processor 21 is not limited to a CPU. Also, an ASIC or the like may be used instead of a CPU. Also, the number of the processors 21 may not be one and may be two or more.

The ROM 22 is a storage device dedicated for reading. The ROM 22 stores firmware, software, and various programs required for operations of the terminal 20. The RAM 23 is an arbitrarily writable storage device. The RAM 23 is used as a work area for the processor 21 and temporarily stores the firmware and the like stored in the ROM 22.

The wireless module 24 is a module configured to perform processing required for wireless LAN communication. The wireless module 24 forms a MAC frame for wireless communication from data transferred from the processor 21, for example, converts the formed MAC frame into a wireless signal, and transmits the wireless signal to the base station 10. Also, the wireless module 24 receives a wireless signal from the base station 10, extracts data from the received wireless signal, and transfers the data to the processor 21, for example.

The display 25 is a display device that displays various screens. The display 25 may be a liquid crystal display, an organic EL display, or the like. Also, the display 25 may include a touch panel. The storage 26 is a storage device such as a hard disk drive (HDD) or a solid state drive (SSD). The storage 26 stores various applications to be executed by the processor 21, for example.

Figure 4:
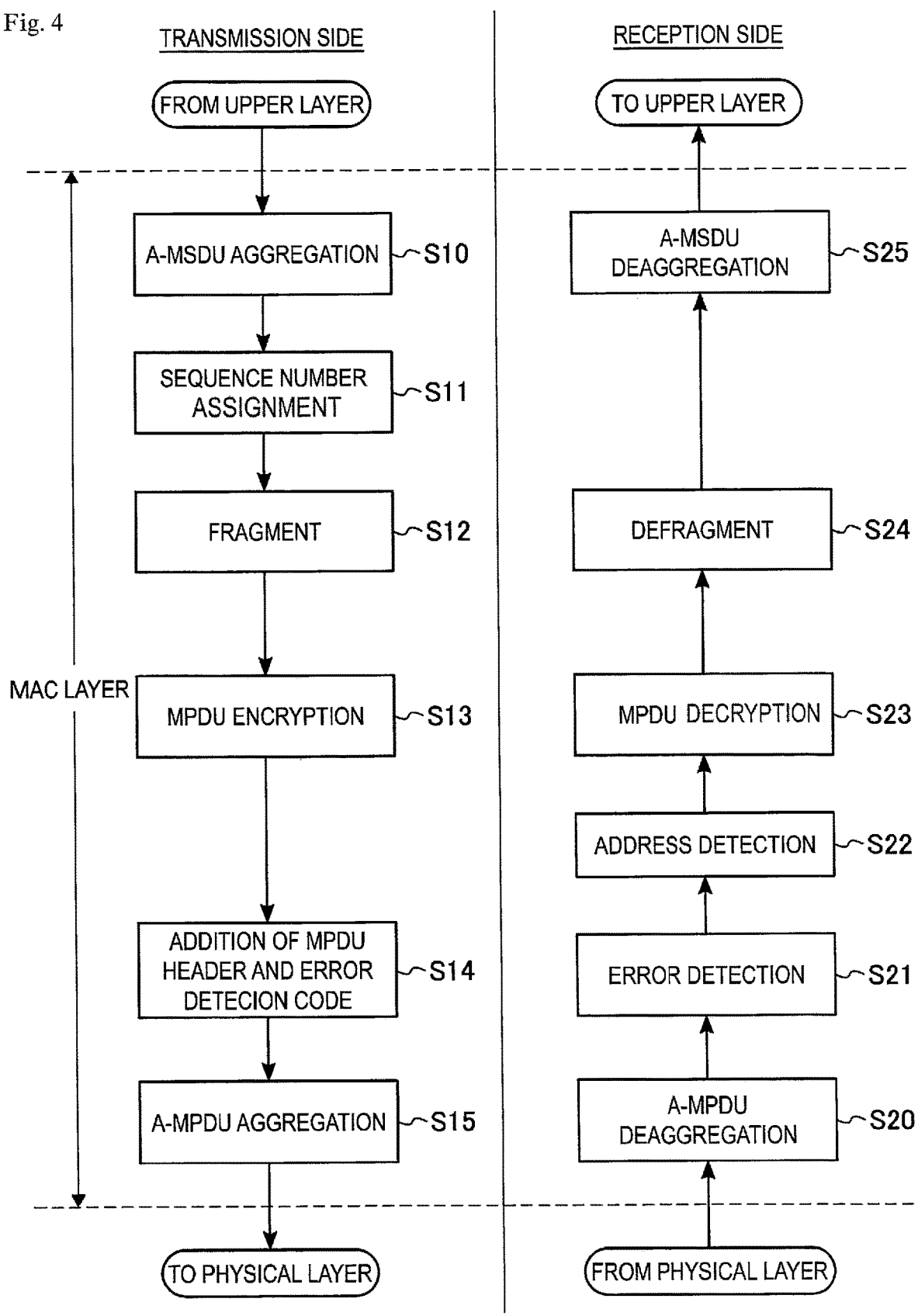
FIG. 4 is a diagram illustrating processing of a media access control (MAC) layer for communication between the base station and the terminal.

Next, processing of the MAC layer for communication between the base station 10 and the terminal 20 will be described with reference to a conceptual diagram in FIG. 4. FIG. 4 illustrates both processing on a transmission side and processing on a reception side. When the wireless module of one of the base station 10 and the terminal 20 performs the processing on the transmission side, the wireless module of the other one of the base station 10 and the terminal 20 performs the processing on the reception side. In the following example, the wireless modules on the transmission side and the reception side will be described without distinction.

First, the processing on the transmission side will be described. In Step S10, the wireless module performs A-MSDU aggregation. Specifically, the wireless module merges a plurality of items of data input from an upper layer such as an application layer to generate an aggregate-MAC service data unit (A-MSDU).

In Step S11, the wireless module allocates a sequence number (SN) to the A-MSDU. The sequence number is a unique number for identifying the A-MSDU.

In Step S12, the wireless module fragments (splits) the A-MSDU into a plurality of MAC protocol data units (MPDUs).

In Step S13, the wireless module encrypts each MPDU and generates an encrypted MPDU.

In Step S14, the wireless module adds a MAC header and an error detection code (FCS) to each encrypted MPDU. The error detection code is, for example, a cyclic redundancy check (CRC) code.

In Step S15, the wireless module performs A-MPDU aggregation. Specifically, the wireless module merges the plurality of MPDUs to generate an aggregate-MAC protocol data unit (A-MPDU) as a MAC frame. After Step S15, the wireless module performs physical layer processing on the MAC frame. In other words, the wireless module performs modulation processing or the like on the MAC frame to generate a wireless signal and transmits the wireless signal to the base station 10.

Next, the processing on the reception side will be described. Once a wireless signal is received, the wireless module performs physical layer processing and restores the MAC frame from the wireless signal. Thereafter, the wireless module performs MAC layer processing illustrated in FIG. 4.

In Step S20, the wireless module performs A-MPDU deaggregation. Specifically, the wireless module splits the A-MPDU into units of MPDUs.

In Step S21, the wireless module performs error detection. For example, the wireless module determines whether the wireless signal has successfully been received by the CRC. When the reception of the wireless signal has been failed, the wireless module may provide a retransmission request. At this time, the wireless module may provide a retransmission request in units of MPDUs. On the other hand, when the wireless signal has successfully been received, the wireless module performs the following processing.

In Step S22, the wireless module performs address detection. At this time, the wireless module determines whether the transmitted MPDU has been directed to the wireless module itself based on an address recorded in an MAC header of each MPDU. When the MPDUs have not been directed to the wireless module itself, the wireless module does not perform the following processing. When the MPDUs have been directed to the wireless module itself, the wireless module performs the following processing.

In Step S23, the wireless module decodes the encrypted MPDUs.

In Step S24, the wireless module performs defragment on the MPDUs. In other words, the wireless module restores the A-MSDU from the plurality of MPDUs.

In Step S25, the wireless module performs A-MSDU deaggregation. Specifically, the wireless module restores the A-MSDU into data for each MSDU. After Step S25, the wireless module outputs the data to the upper layer of the MAC layer. The upper layer is, for example, an application layer.

Figure 5:
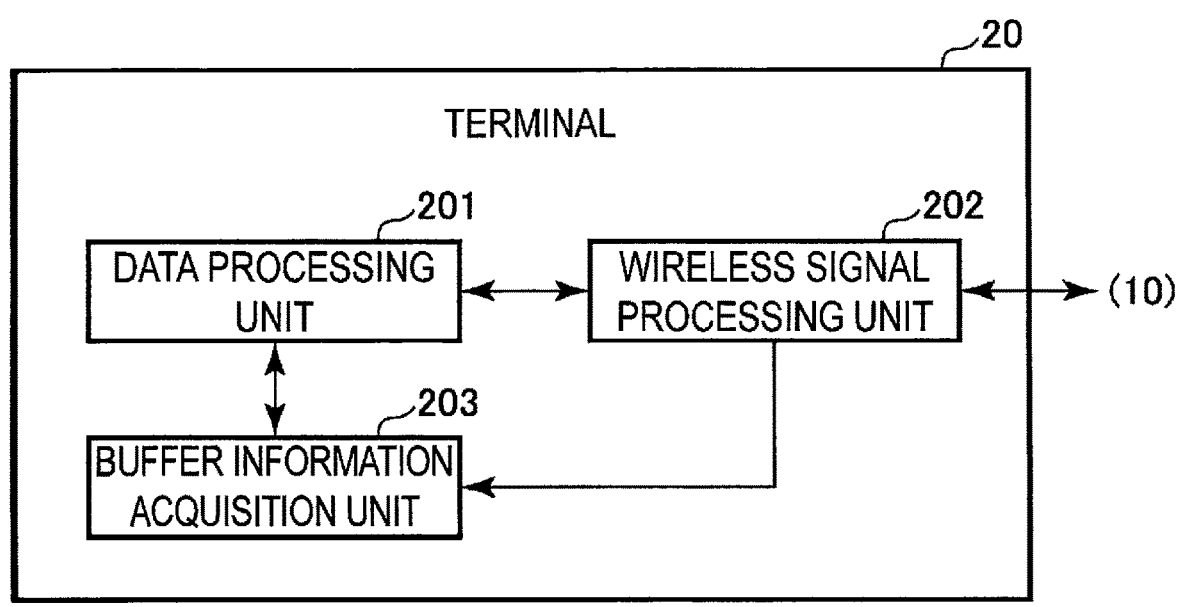
FIG. 5 is a functional block diagram of the base station.

Next, a functional block diagram of the terminal 20 will be described with reference to FIG. 5. The terminal 20 includes a data processing unit 201, a wireless signal processing unit 202, and a buffer information acquisition unit 203. The data processing unit 201, the wireless signal processing unit 202, and the buffer information acquisition unit 203 are realized by the processor 21 and the wireless module 24, for example.

The data processing unit 201 forms a MAC frame from the data input from the upper application, for example. Also, the data processing unit 201 restores data from the MAC frame transferred from the wireless signal processing unit 202. The data is used by the upper application, for example. Specifically, in a case in which the application has a restriction related to a latency during data communication, the data processing unit 201 generates a negotiation frame (also referred to as a first frame) including requirements related to a latency during data communication and inquiring whether communication that satisfies the requirements can be performed. The requirements include, for example, a request related to communication quality such as a latency and a jitter in data communication.

The present embodiment assumes as an application having a latency restrictions, an application in which communication latency significantly affects the quality of service (hereinafter, also referred to as a real-time application or RTA) such as a control application for an on-line game (network game) or an industrial robot, for example. Note that the application is not limited to such applications and it is possible to apply the configuration and the processing disclosed in the present embodiment to any application as long as it has a requirement related to communication quality.

In a case in which receiving, from the base station 10, a notification that communication satisfying the requirements is possible, the data processing unit 201 generates a status notification frame (also referred to as a second frame) including information related to a buffer status of transmitted data in accordance with the requirements. The buffer status indicates, for example, information related to the amount of data accumulated in a transmission queue when data is transmitted. The buffer may include a measured waiting time and an average time of the measured waiting time and a statistical value of a jitter or the like. Hereinafter, the buffer status may include information that can be measured in relation to the buffer in addition to the amount of accumulated data and include information related to each latency time required for the data input from a real-time application to be received by the base station 10 (including a time required from being input at the end of a bugger to reaching a head of the buffer, a transmission latency caused by a busy channel, a time required for retransmission due to a transmission failure, and the like). The transmission queue according to the present embodiment is a transmission queue of the wireless signal processing unit 202 when transmission control based on the EDCA scheme is assumed, and details thereof will be described below.

The wireless signal processing unit 202 performs processing for transmitting or receiving wireless signals. For example, the wireless signal processing unit 202 converts the MAC frame formed by the data processing unit 201 into a wireless signal and transmits the wireless signal to the base station 10, for example. Specifically, the wireless signal processing unit 202 converts a negotiation frame and a status notification frame into wireless signals and transmits the wireless signals to the base station 10. Also, the wireless signal processing unit 202 receives wireless signals from the base station 10, extracts a MAC frame from the received wireless signals, and transfers the MAC frame to the data processing unit 201.

Here, the wireless signal processing unit 202 may transmit the wireless signals through an enhanced distributed channel access (EDCA) that is a priority control scheme, for example. In this case, the wireless signal processing unit 202 includes transmission queues AC_VO, AC_VI, AC_BE, and AC_BK for each access category (AC). The transmission queue AC_VO is a queue for holding a MAC frame categorized into VO (voice). The transmission queue AC_VI is a queue for holding a MAC frame categorized into VI (video). The transmission queue AC_BE is a queue for holding a MAC frame categorized into BE (best effort). The transmission queue AC_BK is a queue for holding a MAC frame categorized into BK (background). Note that the categorization may be performed for each traffic type (TID) instead of the access categories. The TID is applied in units of applications (sessions) handled by the terminal 20. The aforementioned mapping to the access categories may be performed based on the TID.

The wireless signal processing unit 202 maps the MAC frame transferred from the data processing unit 201 into any of the four access categories in accordance with the category of the data recorded in the MAC frame. The wireless signal processing unit 102 inputs the MAC frame into a corresponding transmission queue in accordance with the result of the mapping.

The wireless signal processing unit 202 confirms through a carrier sense for each access category that transmission of wireless signals by another terminal or the like is not performed and waits for transmission for a period of time defined by the access parameters set for each access category. If wireless signals are not transmitted from another terminal or the like during waiting for the transmission, the wireless signal processing unit 202 extracts the MAC frame from the corresponding transmission queue, converts the MAC frame into a wireless signal, and transmits the wireless signal.

Here, the access parameters may be allocated such that relative priority is placed on transmission of the wireless signal in the order of VO, VI, BE, and BK. The access parameters may include CWmin, CWmax, AIFS, and TXOPLimit. CWmin and CWmax are the minimum value and the maximum value of a contention window (CW), which is a transmission latency, respectively. The transmission queue is more likely to obtain a transmission right as CWmin and CWmax become shorter. The arbitrary inter frame space (AIFS) is a frame transmission interval of the wireless signal that can be set in any suitable manner. The priority of the transmission queue becomes higher as the AIFS becomes smaller. TXOPLimit is an upper limit value of the transmission opportunity (TXOP) which is a channel occupation time. Many wireless signals can be transmitted with one transmission right as the value of TXOPLimit increases.

Figure 6:
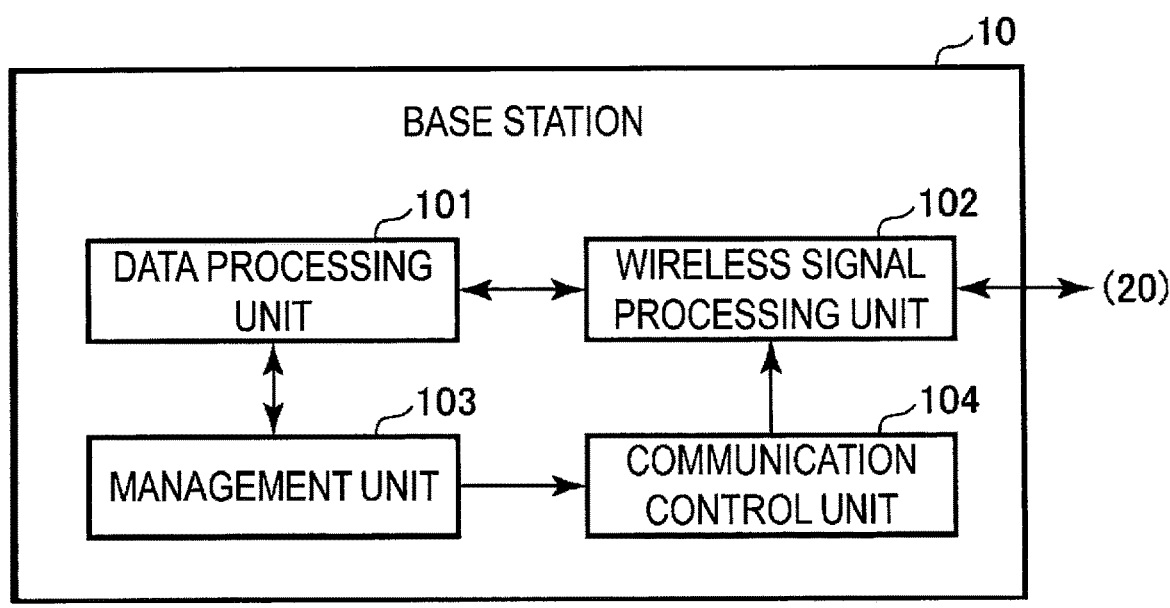
FIG. 6 is a functional block diagram of the terminal.

Next, an example of the functional block diagram of the base station 10 will be described with reference to FIG. 6. The base station 10 includes a data processing unit 101, a wireless signal processing unit 102, a management unit 103, and a communication control unit 104. The data processing unit 101, the wireless signal processing unit 102, the management unit 103, and the communication control unit 104 are realized by the processor 11 and the wireless module 14, for example.

The data processing unit 101 generates an MAC frame from data transferred from the server in the network. Also, the data processing unit 101 restores data from the MAC frame transferred from the wireless signal processing unit 102. Specifically, the data processing unit 101 determines whether communication that satisfies a requirement can be performed between the base station 10 and the terminal 20 in a case in which a negotiation frame is received from the terminal 20. In a case in which it is determined that the communication that satisfies the requirement is possible, the data processing unit generates a frame (also referred to as a permission notification) that permits communication with priority on traffic related to data of the real-time application (hereinafter, also referred to as a RTA traffic). Also, in a case in which a status notification frame is received from the terminal 20, the data processing unit 101 determines whether there is a probability that the requirements is not satisfied in subsequent communication, from buffer information and a traffic status in the service area of the base station 10. Note that when there is a server that manages availability of handling of the real-time application in the network, which is not illustrated, in the case in which it is determined whether the requirement is satisfied, the base station 10 may notify the server of the determination result. In a case in which the server can be accessed from a mobile network (4G, 5G, or the like), for example, the terminal 20 can also acquire the availability of the handling of the real-time application through the communication line. It is possible to enhance a success rate by the terminal 20 starting negotiation with the base station 10 that accesses the server first and is determined to satisfy the requirement in the real-time application.

The wireless signal processing unit 102 performs processing for transmitting or receiving a wireless signal. For example, the wireless signal processing unit 102 converts a MAC frame formed by the data processing unit 101 into a wireless signal and transmits the wireless signal to the terminal 20. Also, the wireless signal processing unit 102 receives a wireless signal from the terminal 20, extracts a MAC frame from the received wireless signal, and transfers the MAC frame to the data processing unit 101. Specifically, the wireless signal processing unit 102 converts a permission notification into a wireless signal and transmits the wireless signal.

The management unit 103 manages requirements transmitted from the terminal 20. For example, the management unit 103 manages a correspondence between the terminal 20 and the requirements transmitted by the terminal 20 in a table, for example, and uses information managed by the table at a necessary timing.

In a case in which there is a probability that the requirements cannot be satisfied in communication of the terminal 20 that desires communication under the requirements based on the correspondence managed by the management unit 103, the communication control unit 104 controls a transmission opportunity of the terminal such that the communication of the terminal 20 is prioritized. A method for controlling the communication opportunity will be described below.

Figure 7:
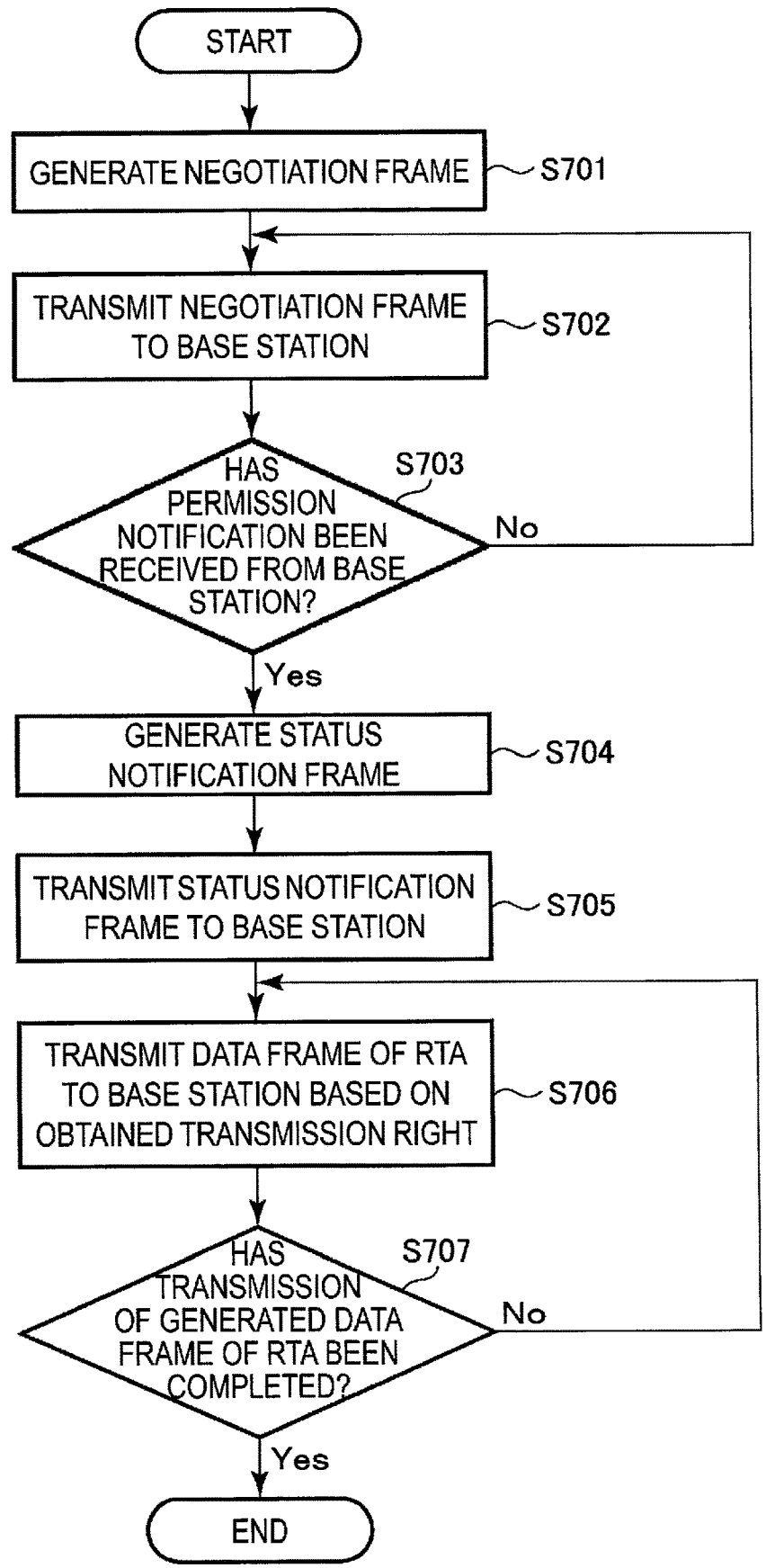
FIG. 7 is a flowchart illustrating operations of the terminal according to the present embodiment.

Next, operations of the terminal 20 according to the present embodiment will be described with reference to the flowchart of FIG. 7. Note that the operations of the terminal 20 illustrated in FIG. 7 include a negotiation phase from Step S701 to Step S703 and a communication phase from Step S704 to Step S707.

In Step S701, the data processing unit 201 generates a negotiation frame. The negotiation frame includes information related to a maximum latency that can be allowed by the real-time application here. In Step S702, the wireless signal processing unit 202 converts the negotiation frame into a wireless signal and transmits the wireless signal to the base station 10. In the transmission of the negotiation frame, the wireless signal processing unit 102 transmits the negotiation frame as a wireless signal in a case in which the terminal 20 obtains a transmission right through access control based on the CSMA/CA scheme, for example.

In Step S703, the data processing unit 201 determines whether a permission notification has been received from the base station 10. In a case in which the terminal 20 has received the permission notification, the processing proceeds to Step S704. In this manner, negotiation is completed in the negotiation phase. On the other hand, in a case in which the terminal 20 has not received any permission notification, that is, in a case in which time-out has been reached without any permission notification for a specific period of time, or in a case in which a rejection notification has been received, the processing is returned to Step S702, and the same processing is repeated. This is because it is determined that the RTA traffic cannot be prioritized due to a channel congestion status at the timing when the negotiation frame has been received, and there is room in channels and there is a probability that the RTA traffic is prioritized at another timing.

In Step S704, a case in which data generated by the real-time application (hereinafter, referred to as RTA data) has occurred in the communication phase is assumed. In this case, the data processing unit 201 generates a status notification frame to transmit the RTA data to the base station 10 and to notify the base station 10 of the buffer status of the terminal itself. Specifically, if the RTA data is input from an upper layer to the data processing unit 201, the data processing unit 201 acquires, as a buffer status, the amount of data accumulated in transmission queues for the RTA data and generates a status notification frame including the information related to the amount of data and the RTA data body.

In Step S705, the data processing unit 201 transmits the status notification frame to the base station 10. In the transmission of the status notification frame, the wireless signal processing unit 102 converts the status notification frame into a wireless signal and transmits the wireless signal using the access control based on the CSMA/CA scheme, for example, similarly to Step S702.

In Step S706, the wireless signal processing unit 202 converts the status notification frame into a wireless signal and transmits the wireless signal to the base station 10 based on a transmission right of the obtained channel access. The terminal 20 has a transmission queue for each access category and performs a channel access based on the CSMA/CA for each transmission queue using the access parameter as described above allocated to each access category. For example, an access category AC_RTA for RTA may be added in addition to the access categories (AC_VO, AC_VI, AC_BE, and AC_BK) as described above. In other words, a transmission queue for AC_RTA may be prepared, and the access parameter of the AC_RTA may be set with the highest priority. In this manner, it is possible to transmit a data frame of RTA with priority from the transmission queue for AC_RTA and to prioritize the RTA traffic, in a case in which the transmission right is given to the terminal 20 from the base station 10.

In the case in which the transmission right is given from the base station 10, the wireless signal processing unit 202 converts the data frame of RTA accumulated in the RTA queue into a wireless signal in order from the head of the RTA queue and transmits the wireless signal. Note that for convenience of explanation, data other than the RTA data categorized into the access category AC_RTA, that is, data categorized into the access categories AC_VO, AC_VI, AC_BE, and AC_BK will also be referred to as non-RTA data.

In Step S707, whether transmission of all the generated data frames of RTA has been completed is determined. The processing ends in a case in which all the generated data frames of RTA have been transmitted, or the processing returns to Step S706, and the same processing is repeated in a case in which the transmission of all the items of generated RTA data has not been completed. Note that it is necessary to repeat the processing from Step S704 to Step S707 every time RTA data is generated.

Figure 8:
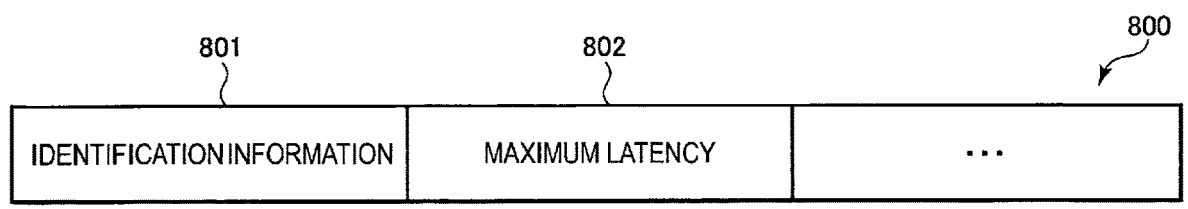
FIG. 8 is a diagram illustrating an example of a format of a negotiation frame.

Next, an example of a format of a negotiation frame generated by the terminal 20 will be described with reference to FIG. 8. A negotiation frame 800 includes a header field 801 including identification information and the like of the terminal 20 and a maximum latency field 802 indicating requirements in the real-time application, that is, the maximum latency that can be allowed by the real-time application. Note that another type of information related to communication quality such as the maximum jitter that can be allowed by the real-time application may be included in the negotiation frame 800.

Figure 9:
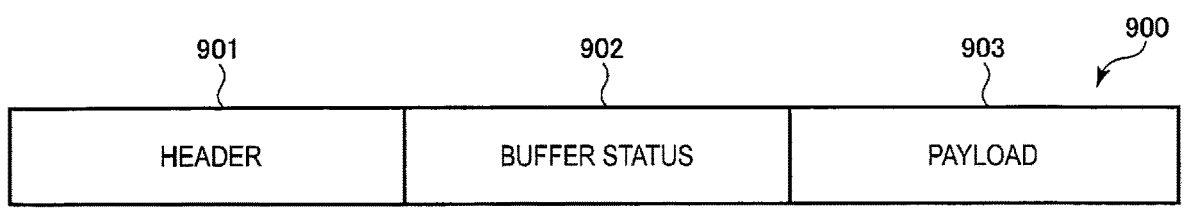
FIG. 9 is a diagram illustrating an example of a format of a status notification frame.

Next, an example of a format of a status notification frame generated by the terminal 20 will be described with reference to FIG. 9. The status notification frame 900 includes a header field 901 including identification information of the terminal, a buffer status field 902 indicating a buffer status of RTA data, and a payload field 903 in which the RTA data body is stored. Note that the status notification frame 900 may not include the RTA data body in the payload field 903 in a case in which only the buffer status is to be provided to the base station 10.

Also, it is assumed that the buffer status is stored in the buffer status field 902 independent from the header field 901 and the payload field 903, but it is not limited to the assumption, and the buffer status may be included in the header field 901 or the payload field 903 without providing the buffer status field 902.

Figure 10:
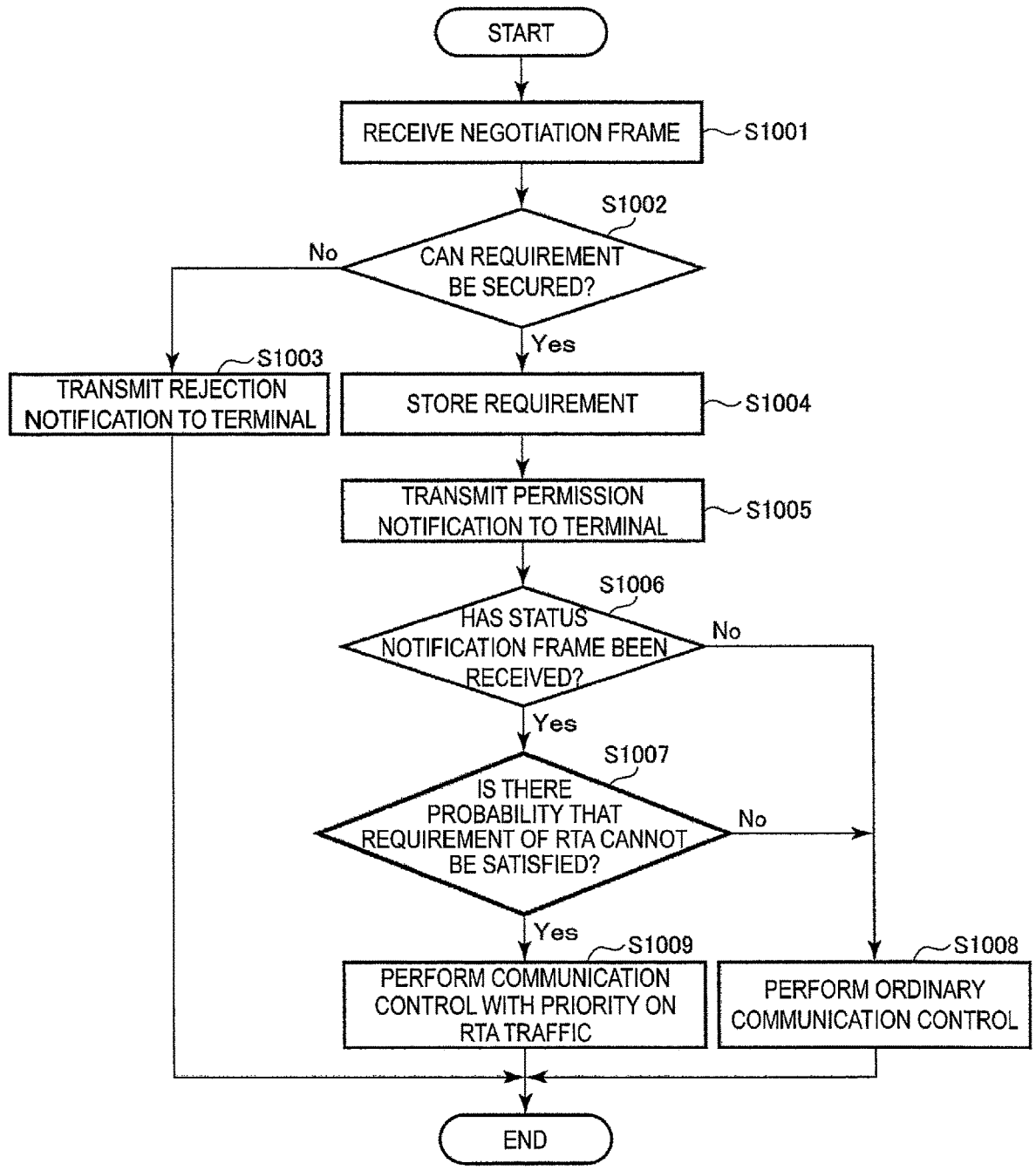
FIG. 10 is a flowchart illustrating operations of the base station according to the present embodiment.

Next, operations of the base station 10 according to the present embodiment will be described with reference to the flowchart in FIG. 10. The operations of the base station 10 illustrated in FIG. 10 includes a negotiation phase from Step S1001 to Step S1003 and a communication phase from Step S1004 to Step S1009.

In Step S1001, the wireless signal processing unit 102 receives a negotiation frame from the terminal 20. The wireless signal processing unit 102 extracts the requirements (a maximum latency, for example) in the RTA from the negotiation frame.

In Step S1002, the data processing unit 101 determines whether the extracted requirements in the real-time application is satisfied based on the current communication status. Specifically, the data processing unit 101 may determine whether occurrence of a latency that exceeds the maximum latency required by the real-time application is expected, in consideration of at least one of determination materials such as a traffic congestion status in the service area of the base station 10, a period during which a channel is continuously occupied by an interference wave, and a determination material, such as the number of sessions for RTA that have already been established, as a communication status, for example.

More specifically, in a case in which the interference wave is used as the determination material, for example, the data processing unit 101 determines that the requirements in the real-time application cannot be satisfied if the period during which the channel is continuously occupied by an interference wave is equal to or greater than a threshold value, and the data processing unit 101 determines that the requirements in the real-time application can be satisfied if the period during which the channel is occupied is less than the threshold value. In a case in which the number of sessions for RTA that have already been established is used as the determination material, it is necessary to determine that the requirements cannot be satisfied if the number of sessions for RTA that have already been established exceeds a setting value as the maximum number of sessions for RTA, and it is necessary to determine that the requirements can be satisfied if the number of sessions for RTA is equal to or less than the setting value. Alternatively, it is necessary to determine that the requirements cannot be satisfied if a latency assumed in a case in which a latency of sessions for RTA that have already been established is secured and a new session for RTA is also accepted through linear prediction from a latency measured in actual communication of each session for RTA exceeds the required latency, and to determine that the requirements can be satisfied if the assumed latency is equal to or less than the required latency even if the new session for RTA is accepted.

As a traffic congestion status, it is necessary to determine that the requirements cannot be satisfied if an average value, the maximum latency, jitter, or the like exceeds a threshold value and to determine that the requirements can be satisfied if the average value, the maximum latency, the jitter, or the like is equal to or less than the threshold value, based on a latency when an existing RTA traffic is transmitted as measured inside the base station 10 or a latency when an existing RTA traffic is transmitted as reported from the terminal 20. Alternatively, it is necessary to determine that the requirements cannot be satisfied if the average value, the maximum latency, the jitter, or the like exceeds the threshold value due to acceptance of the new RTA traffic, and to determine that the requirements can be satisfied if the average value, the maximum latency, the jitter, or the like is equal to or less than the threshold value regardless of the acceptance of the new RTA traffic, through linear prediction or the like.

Note that the data processing unit 101 may use, as one of the determination materials, a report of a measurement result of the latency or the jitter for each access category in a case in which the report can be received from the terminal 20.

In a case in which occurrence of a latency exceeding the maximum latency is assumed based on the current communication status, the requirements cannot be satisfied, and the processing proceeds to Step S1003. On the other hand, in a case in which the occurrence of a latency that is equal to or less than the maximum latency is assumed, the requirements can be satisfied, and the processing proceeds to Step S1004. Note that the determination material for determining the requirements is not limited to the aforementioned materials, the determination may be made using any information as long as the information can a material determining whether the requirements can be satisfied.

In Step S1003, the data processing unit 101 and the wireless signal processing unit 102 of the base station 10 transmits, to the terminal 20 that has transmitted the negotiation frame, a rejection notification indicating that the communication that satisfies the requirements is not possible. In Step S1004, the management unit 103 acquires and stores the requirements extracted from the negotiation frame, in this case, information related to the maximum latency.

In Step S1005, the data processing unit 101 and the wireless signal processing unit 102 of the base station 10 transmit, to the terminal 20 that has transmitted the negotiation frame, a permission notification indicating that the communication that satisfies the requirements can be secured. Note that the base station 10 may provide a request for transmission of ACK in response to the permission notification. In this manner, negotiation is completed in the negotiation phase.

In Step S1006, the data processing unit 101 determines whether the status notification frame has been received from the terminal 20. The processing proceeds to Step S1007 in a case in which the status notification frame is received, or the processing proceeds to Step S1008 in a case in which the status notification frame is not received.

In Step S1007, the data processing unit 101 determines whether there is a probability that the RTA traffic is retained and the requirements cannot be satisfied in the later communication, based on the buffer status included in the status notification frame. Specifically, it is considerable that, when the amount of data indicated by the buffer status is equal to or greater than the threshold value, the RTA traffic is retained and the latency during data communication does not fall within the maximum latency obtained through the negotiation with the terminal 20, and it is thus necessary for the data processing unit 101 to determine that the requirements may not be satisfied in the subsequent communication.

Moreover, whether there is a probability that the requirements cannot be satisfied may be determined in further consideration of a communication status similarly to the case in which the requirements is determined, as illustrated in Step S1002, in addition to the buffer status. The processing proceeds to Step S1009 in a case in which there is a probability that the requirements cannot be satisfied, or the processing proceeds to Step S1008 in a case in which there is no probability that the requirements cannot be satisfied.

In Step S1008, the communication control unit 104 performs communication control in regard to the non-RTA data, that is, the ordinary data frame. In Step S1009, the communication control unit 104 performs communication control such that the RTA traffic is not retained, that is, such that the requirements are satisfied. As a method for the communication control, a beacon signal including a notification indicating that the access parameter is to be changed such that the RTA traffic is transmitted with priority, for example, is transmitted to the terminal 20. The RTA traffic is transmitted with priority by the terminal 20 setting the parameter in accordance with the access parameter included in the beacon signal. Alternatively, a frequency at which a transmission opportunity is given from the base station 10 to the terminal 20 may be increased by the base station 10 transmitting a polling frame to the terminal 20 based on a hybrid coordination function controlled channel access (HCCA) scheme. Alternatively, the frequency at which the transmission right is given to the terminal 20 may be increased such that more transmission opportunities can be obtained, through a trigger frame of an orthogonal frequency division multiple access (OFDMA). For example, it is necessary for the communication control unit 104 to perform control to extend the TXOP period to be allocated to the terminal 20 as the amount of data indicated by the buffer status increases.

Here, a case in which a polling frame based on the HCCA scheme is used will be described as an example of transmission opportunity control performed by the base station 10 for the terminal 20, with reference to FIG. 11. Note that it is possible to perform the control based on a scheme similar to that in FIG. 11 even in a case in which the transmission opportunities of the terminal are controlled using a beacon signal and a trigger frame.

Figure 11:
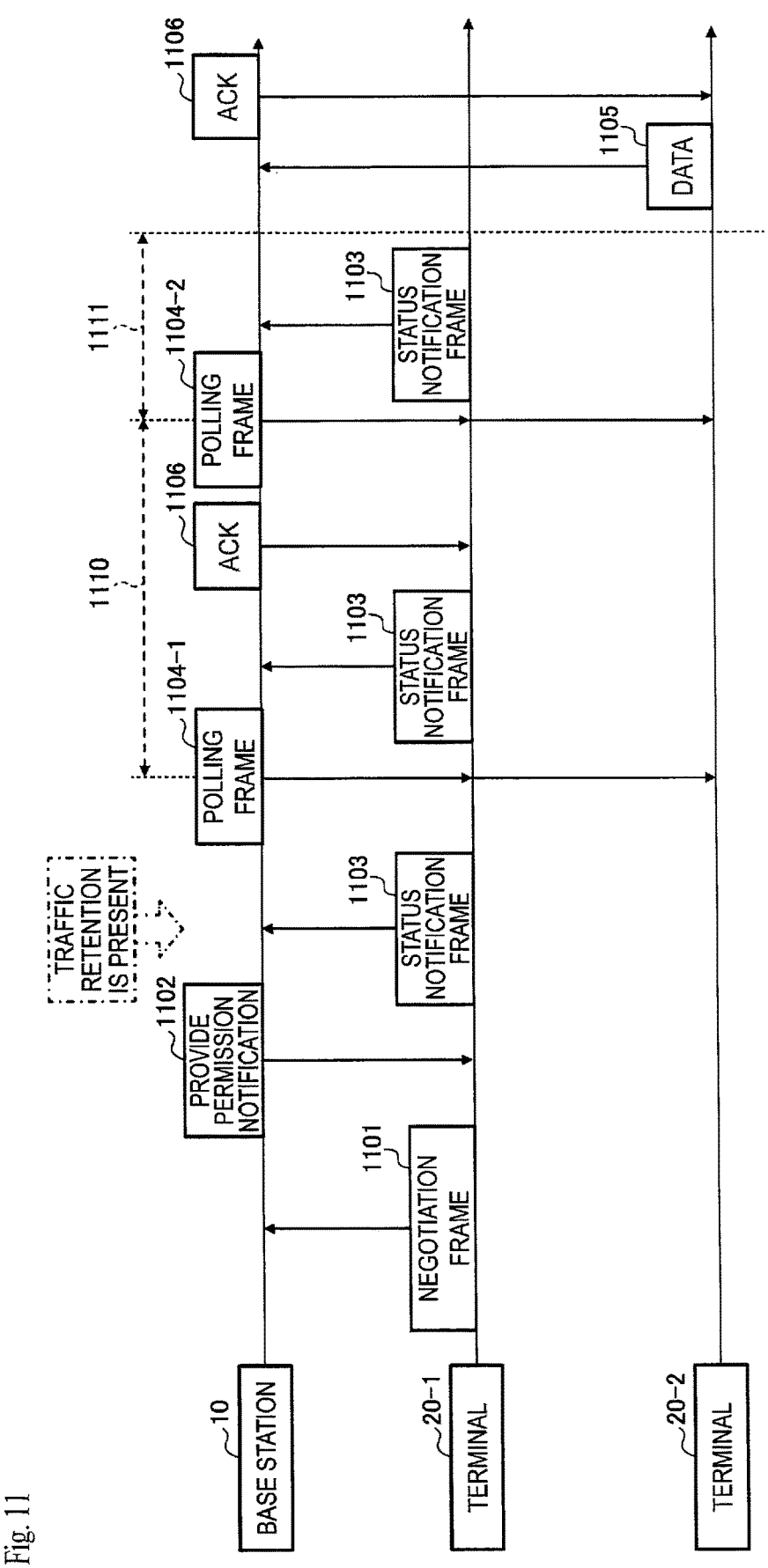
FIG. 11 is a sequence diagram illustrating an example of terminal transmission opportunity control performed by the base station.

FIG. 11 is a sequence diagram illustrating frame transmission and reception between the base station 10 and the terminals 20-1 and 20-2. Here, the terminal 20-1 is a terminal (hereinafter, referred to as an RTA terminal) with requirements in the real-time application while the terminal 20-2 is a terminal that performs ordinary data communication with no requirements in the real-time application. Note that each of the numbers of the RTA terminals and the terminals that perform ordinary data communication may be two or more.

First, the terminal 20-1 transmits, to the base station 10, a negotiation frame 1101 indicating whether communication based on the requirements (maximum latency) in the real-time application can be performed. The base station 10 determines the requirements included in the negotiation frame 1101 and transmits a permission notification 1102 to the terminal 20-1 on the assumption that the requirements can be satisfied in this case.

The terminal 20-1 can recognize from the permission notification 1102 that the requirements can be satisfied, and thus transmits a status notification frame 1103 including RTA data.

The base station 10 monitors the traffic status such that the latency of the RTA data falls within the maximum latency of the requirements. Here, a case in which there is a probability that an accumulated RTA traffic is retained from the buffer status of the RTA data based on the status notification frame 1103 received by the base station 10 from the terminal 20-1 is assumed.

In this case, the base station 10 generates a polling frame including an instruction to provide a transmission opportunity to the terminal 20-1. The base station 10 transmits the generated polling frame 1104-1 to the terminal group belonging to the station itself, that is, the terminal 20-1 and the terminal 20-2. Because a transmission opportunity is given with priority to the terminal 20-1 that has received the polling frame 1104-1 from the base station, the terminal 20-1 generates the status notification frame 1103 including the RTA data and transmits the status notification frame 1103 to the base station 10. Thereafter, it is possible to perform data communication with priority for the RTA data, such as reception of ACK 1106 from the base station 10.

Note that in a case in which the RTA requirements cannot be satisfied during a TXOP period given by one polling frame 1104-1, a polling frame 1104-2 including an instruction to provide a transmission opportunity to the terminal 20-1 may be transmitted at a cycle with a period 1110 of the maximum latency time that is the requirements. In this manner, the terminal 20-1 can successively obtain the transmission opportunity, for example, and can thus appropriately perform communication control for the RTA data.

On the other hand, the terminal 20-2 does not perform data transmission and reception until the TXOP period (the period 1111 in the example in FIG. 11) of the terminal 20-1 ends after the second polling frame 1104-2 is transmitted in the example in FIG. 11 because the period corresponds to a transmission inhibition period. The terminal 20-2 can transmit a data frame 1105 in a case in which a transmission right is obtained after the transmission inhibition period ends.

According to the present embodiment described above, the terminal can transmit a negotiation frame to the base station in regard to whether the requirements in the real-time application can be satisfied between the base station and the terminal. In a case in which the base station determines that the requirements can be satisfied, the base station transmits a permission notification to the terminal, thereby completing the negotiation. The terminal transmits a buffer status of the RTA data to the base station that is a target of the notification, when the RTA data is communicated. In this manner, the base station can perform transmission control of providing a transmission opportunity from the base station to the terminal with priority such that priority is placed on the RTA traffic in a case in which there is a probability that the data of the RTA traffic may be retained. As a result, it is possible to provide a wireless communication environment corresponding to the requirements in the RTA traffic.

Also, the processing in the aforementioned embodiment can also be stored as a program that a processor, which is a computer, can be caused to execute. In addition, the processing can be stored and distributed in a storage medium of an external storage device such as a magnetic disk, an optical disc, or a semiconductor memory. Then, the processor can execute the aforementioned processing by reading the program stored in the storage medium of the external storage device and by the read program controlling operations.

It is to be noted that the present disclosure is not limited to the aforementioned embodiments and can be variously modified in the implementation stage without departing from the gist of the present disclosure. An appropriate combination of the embodiments can also be implemented, in which a combination of their effects can be obtained. Further, the above embodiments include various disclosures, which can be designed by combining constituent elements selected from a plurality of constituent elements disclosed here. For example, a configuration in which some constituent elements are removed from all the constituent elements illustrated in the embodiments can be designed as a disclosure if the problems can be solved and the effects can be achieved.

Reference Signs List

1 Communication system
10 Base station
11, 21 Processor
12, 22 ROM
13, 23 RAM
14, 24 Wireless module
15 Router module
20 Terminal
25 Display
26 Storage
101, 201 Data processing unit
102, 202 Wireless signal processing unit
103 Management unit
104 Communication control unit
203 Buffer information acquisition unit

The invention claimed is:

1. A base station comprising:
a data processing unit, implemented with one or more processors, configured to determine whether or not communication that satisfies a requirement related to a latency during data communication is possible when receiving, from a terminal apparatus, a first frame including the requirement; and
a wireless signal processing unit, implemented with the one or more processors, configured to transmit a permission notification to the terminal apparatus when it is determined that the communication that satisfies the requirement is possible,
wherein, when receiving a second frame including information related to a buffer status of data transmitted from the terminal apparatus in accordance with the requirement, the data processing unit is configured to determine from the buffer status and a traffic status whether or not there is a probability that the requirement is not satisfied in subsequent communication, and
the base station further comprises a control unit, implemented with the one or more processors, configured to control a transmission opportunity (TXOP) such that communication with the terminal apparatus is prioritized when it is determined that there is the probability that the requirement is not satisfied in the subsequent communication.

2. The base station according to claim 1, wherein the control unit is configured to extend a transmission opportunity period to be allocated to the terminal apparatus as an amount of data indicated in the buffer status increases.

3. The base station according to claim 1, wherein the control unit is configured to control the transmission opportunity of the terminal apparatus using at least one of a polling frame, a trigger frame, and a beacon signal each including a parameter that prioritizes communication with the terminal apparatus.

* * * * *